US012034252B2

(12) United States Patent
Maesoba et al.

(10) Patent No.: US 12,034,252 B2
(45) Date of Patent: Jul. 9, 2024

(54) CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Hiroyoshi Maesoba, Mie (JP); Toshifumi Ichio, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 348 days.

(21) Appl. No.: 17/629,495

(22) PCT Filed: Jul. 22, 2020

(86) PCT No.: PCT/JP2020/028469
§ 371 (c)(1),
(2) Date: Jan. 24, 2022

(87) PCT Pub. No.: WO2021/029200
PCT Pub. Date: Feb. 18, 2021

(65) Prior Publication Data

US 2022/0294159 A1 Sep. 15, 2022

(30) Foreign Application Priority Data

Aug. 9, 2019 (JP) ................................ 2019-147191

(51) Int. Cl.
*H01R 13/639* (2006.01)
*H01R 13/502* (2006.01)
(Continued)

(52) U.S. Cl.
CPC ......... *H01R 13/639* (2013.01); *H01R 13/502* (2013.01); *H01R 13/6581* (2013.01); *H01R 13/6592* (2013.01)

(58) Field of Classification Search
CPC ................ H01R 13/639; H01R 13/502; H01R 13/6581; H01R 13/6592
USPC .......................................................... 439/345
See application file for complete search history.

(56) References Cited

U.S. PATENT DOCUMENTS 6,261,127 B1 * 7/2001 Miskin ............... H01R 13/6592 439/607.41
6,384,335 B1 * 5/2002 Saito .................... H01R 9/0518 439/585
(Continued)

FOREIGN PATENT DOCUMENTS

JP 2004007045 A * 1/2004
JP 2004327075 A * 11/2004 ......... H01R 13/5829
(Continued)

OTHER PUBLICATIONS

International Search Report dated Sep. 24, 2020 for WO 2021/029200 A1 (4 pages).

*Primary Examiner* — Peter G Leigh
(74) *Attorney, Agent, or Firm* — Venjuris, P.C.

(57) ABSTRACT

A connector in the present disclosure is a connector to be connected to a cable and including an inner conductor, an outer conductor and a housing. The outer conductor includes a tubular connecting tube portion and a covering portion. The connecting tube portion accommodates the inner conductor while being electrically insulated from the inner conductor. The covering portion is arranged on an outer periphery of the connecting tube portion. The covering portion includes a fitting hole. An accommodating portion of the housing accommodates the outer conductor together with the inner conductor. An inner wall of the accommo-
(Continued)

dating portion is formed with a terminal locking portion to be fit into the fitting hole. The covering portion includes a locked portion to be locked to the terminal locking portion. The locked portion projects toward the inner wall provided with the terminal locking portion on an opening edge of the fitting hole.

3 Claims, 12 Drawing Sheets

(51) Int. Cl.
*H01R 13/6581* (2011.01)
*H01R 13/6592* (2011.01)

(56) References Cited

U.S. PATENT DOCUMENTS 8,926,368 B2 1/2015 Il
9,673,568 B2 * 6/2017 Tanaka ............... H01R 13/6581
9,847,593 B2 * 12/2017 Nunner .................. H01R 13/42
10,594,057 B2 * 3/2020 Kanemura ............. H01R 43/16
10,644,414 B2 * 5/2020 Kanemura ............. H01R 43/16
10,910,733 B2 2/2021 Miyamoto et al.
2016/0172781 A1 * 6/2016 Nunner .................... H01R 4/38
439/660
2019/0199008 A1 * 6/2019 Kanemura ......... H01R 13/6582
2019/0199013 A1 * 6/2019 Kanemura ............. H01R 4/185
2019/0199014 A1 * 6/2019 Kanemura ........... H01R 13/113
2019/0319389 A1 10/2019 Hara et al.
2020/0021064 A1 1/2020 Maesoba et al.

FOREIGN PATENT DOCUMENTS

JP 3827650 B2 * 9/2006
JP 2009-211811 A 9/2009
JP 4514356 B2 * 7/2010
JP 2016201193 A * 12/2016
JP 2017174576 A * 9/2017 ........... H01R 13/648
WO WO-2018142887 A1 * 8/2018 ............. H01R 13/50

* cited by examiner

CONNECTOR

CROSS REFERENCE TO RELATED APPLICATIONS

This application is a national phase of PCT application No. PCT/JP2020/028469, filed on 22 Jul. 2020, which claims priority from Japanese patent application No. 2019-147191, filed on 9 Aug. 2019, all of which are incorporated herein by reference.

TECHNICAL FIELD

The present disclosure relates to a connector.

BACKGROUND

A connector described in Japanese Patent Laid-open Publication No. 2013-229255 (Patent Document 1 below) is, for example, known as a shield connector connected to an end of a shielded cable in which a communication signal is transmitted. This shield connector includes a shield shell having a tubular shield portion for accommodating a male terminal via an inner housing, a shield shell cover to be assembled with the shield shell, and an outer housing for accommodating the shield shell and the shield shell cover.

Housing locking claws to be locked to the outer housing are provided on shell side plate portions of the shield shell. The housing locking claws are formed by cutting and raising parts of the shell side plate portions.

PRIOR ART DOCUMENT

Patent Document

Patent Document 1: JP 2013-229255 A

SUMMARY OF THE INVENTION

Problems to be Solved

If housing locking claws to be locked to an outer housing are formed by cutting and raising parts of shell side plate portions as in the shield connector of this type, through holes penetrating through the shell side plate portions are formed and external noise enters a first outer conductor (corresponding to the shield shell) and noise leaks to outside from the inside of the first outer conductor through the through holes.

Accordingly, a method for providing a covering portion for covering a tubular accommodating portion from outside by a second outer conductor (corresponding to the shield shell cover) to be assembled with the first outer conductor and locking a terminal locking portion provided on the outer housing into a fitting hole formed to penetrate through the covering portion is considered. According to this configuration, it can be prevented that external noise enters the first outer conductor from outside and noise leaks to outside from the first outer conductor.

However, since the covering portion constituting the fitting hole is generally formed of a metal plate material, the terminal locking portion is shallowly locked to an edge part of the fitting hole. Thus, a shear area of the terminal locking portion by the edge part of the fitting hole is small and an outer conductor holding force of the terminal locking portion is reduced. Further, if a large load is applied to the outer conductor in a direction separating from the outer housing, the terminal locking portion may slip and be disengaged from the fitting hole.

In this specification, a technique is disclosed which improves an outer conductor holding force while suppressing the entrance or leakage of noise into or from an outer conductor.

Means to Solve the Problem

The present disclosure is directed to a connector to be connected to a cable in which an outer periphery of a wire is covered with a shield body, the connector including an inner conductor, an outer conductor, and a housing, wherein the inner conductor is connected to a core of the wire, the outer conductor includes a tubular connecting tube portion, a covering portion and a shield connecting portion, the connecting tube portion accommodates the inner conductor while being electrically insulated from the inner conductor, the covering portion is arranged on an outer periphery of the connecting tube portion, the shield connecting portion is connected to the shield body, the covering portion includes a fitting hole, the fitting hole is formed to penetrate through the covering portion, the housing includes an accommodating portion, the accommodating portion accommodates the outer conductor together with the inner conductor, an inner wall of the accommodating portion is formed with a terminal locking portion to be fit into the fitting hole, the covering portion includes a locked portion for retaining the outer conductor in the accommodating portion by being locked to the terminal locking portion, and the locked portion projects toward the inner wall provided with the terminal locking portion on an opening edge of the fitting hole in the covering portion.

Effect of the Invention

According to the present disclosure, it is possible to improve an outer conductor holding force while suppressing the entrance or leakage of noise into or from an outer conductor.

DETAILED DESCRIPTION TO EXECUTE THE INVENTION

Description of Embodiments of Present Disclosure

Figure 1:
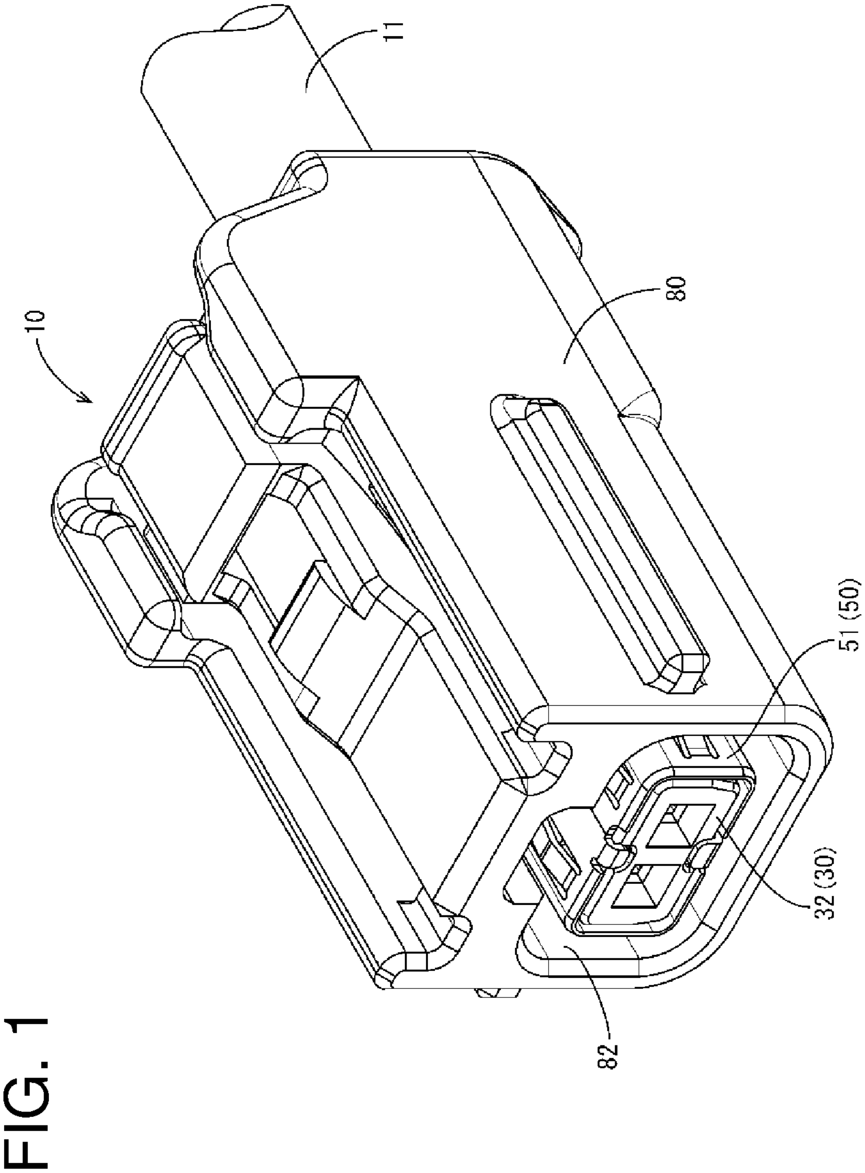
FIG. 1 is a perspective view of a connector.

First, embodiments of the present disclosure are listed and described.

(1) A connector to be connected to a cable in which an outer periphery of a wire is covered with a shield body includes an inner conductor, an outer conductor, and a housing, wherein the inner conductor is connected to a core of the wire, the outer conductor includes a tubular connecting tube portion, a covering portion and a shield connecting portion, the connecting tube portion accommodates the inner conductor while being electrically insulated from the inner conductor, the covering portion is arranged on an outer periphery of the connecting tube portion, the shield connecting portion is connected to the shield body, the covering portion includes a fitting hole, the fitting hole is formed to penetrate through the covering portion, the housing includes an accommodating portion, the accommodating portion accommodates the outer conductor together with the inner conductor, an inner wall of the accommodating portion is formed with a terminal locking portion to be fit into the fitting hole, the covering portion includes a locked portion for retaining the outer conductor in the accommodating portion by being locked to the terminal locking portion, and the locked portion projects toward the inner wall provided with the terminal locking portion on an opening edge of the fitting hole in the covering portion.

Since the locked portion projects on the opening edge of the fitting hole in the covering portion, the terminal locking portion is deeply locked to the locked portion. Further, the terminal locking portion and the locked portion can be locked without providing any hole in the connecting tube portion accommodating the inner conductor. That is, the terminal locking portion can be suppressed from slipping and being disengaged from the locked portion while the entrance or leakage of noise into or from the outer conductor is suppressed.

Further, since the terminal locking portion is deeply locked to the locked portion, a shear area of the terminal locking portion in the locked portion can be increased, for example, as compared to the case where the terminal locking portion is shallowly locked to the locked portion. That is, an outer conductor holding force in the terminal locking portion can be improved.

(2) The covering portion includes a plate-like wall plate arranged along the connecting tube portion, and the locked portion includes a body portion projecting most in the locked portion and an inclined portion obliquely connected to the body portion and the wall plate.

For example, in the case of forming a locked portion projecting from a wall plate, a method for forming the locked portion by cutting and raising a part of the wall plate is considered. However, in the case of forming the locked portion by cutting and raising the part of the wall plate, if a large load is applied in a direction to separate the outer conductor from the accommodating portion, the locked portion may be turned up and the locking of the locked portion and the terminal locking portion may be released.

However, according to the above configuration, since the inclined portion is connected to the body portion and the wall plate, it can be suppressed that the locking of the locked portion and the terminal locking portion is released such as by the turning-up of the locked portion. Further, according to the above configuration, a locking area of the terminal locking portion and the locked portion can be increased by as much as the inclined portion as compared to a locked portion formed by cutting and raising a part of a wall plate. In this way, the shear area of the terminal locking portion in the locked portion can be increased and the outer conductor holding force in the terminal locking portion can be improved.

(3) The inclined portions are formed on both sides of the body portion. Since the inclined portions are formed on both sides of the body portion, it can be suppressed that the locking of the locked portion and the terminal locking portion is released such as by the turning-up of the locked portion, for example, as compared to the case where the inclined portion is formed only on one side of the body portion. Further, the shear area of the terminal locking portion in the locked portion can be increased and the outer conductor holding force in the terminal locking portion can be improved.

DETAILS OF EMBODIMENT OF PRESENT DISCLOSURE

A specific example of a connector of the present disclosure is described with reference to the following drawings. Note that the present disclosure is not limited to these illustrations and is intended to be represented by claims and include all changes in the scope of claims and in the meaning and scope of equivalents.

First Embodiment

A first embodiment of the present disclosure is described with reference to FIGS. 1 to 10.

In this embodiment, a connector 10 for communication is illustrated which is installed, for example, in a vehicle such as an automotive vehicle and disposed in a wired communication path between an in-vehicle electrical component (car navigation system, ETC, monitor, etc.) in the vehicle and an external device (camera, etc.) or between in-vehicle electrical components.

[Connector 10]

The connector 10 is connectable to an unillustrated mating connector. As shown in FIGS. 1 to 4, the connector 10 includes a cable 11, a plurality of inner conductors 20 connected to a front end of the cable 11, a dielectric 30 for accommodating the plurality of inner conductors 20, an outer conductor 50 connected to the cable 11 while covering the dielectric 30, and a housing 80 for accommodating the outer conductor 50.

[Cable 11]

Figure 3:
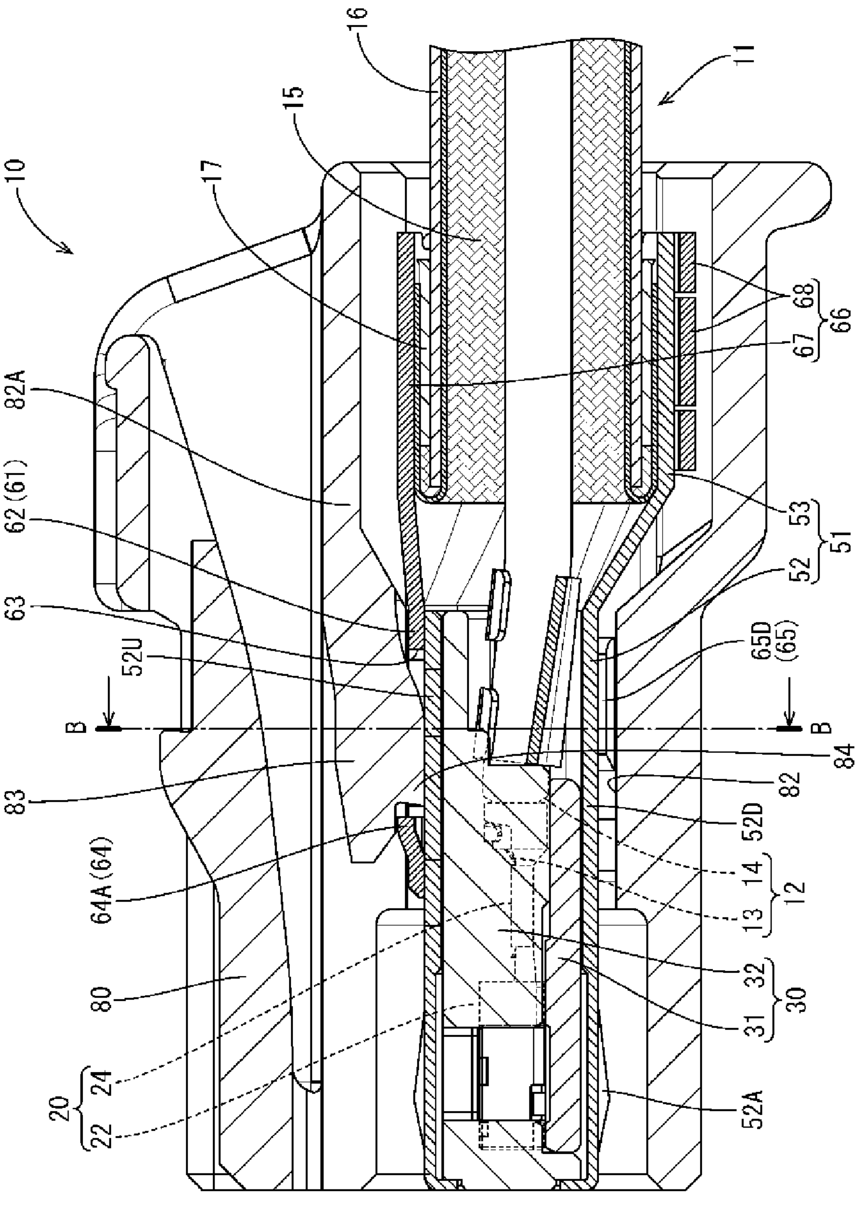
FIG. 3 is a section along A-A of FIG. 2.

As shown in FIG. 3, the cable 11 includes two coated wires (example of a wire) 12 connected to the inner conductors 20, a shield body 15 constituted by a braided wire for collectively covering the outer peripheries of the coated wires 12, and a sheath 16 constituted by an insulating coating for covering the outer periphery of the shield body 15.

In the front end of the cable 11, the sheath 16 is stripped and the shield body 15 exposed from an end of the sheath 16 is folded onto an end part of the sheath 16.

A sleeve 17 made of metal is arranged inside the shield body 15 folded onto the end part of the sheath 16. The sleeve 17 is formed into a hollow cylindrical shape by processing a metal plate material.

[Inner Conductors 20]

The inner conductor 20 is formed by processing a conductive metal plate material. As shown in FIG. 3, the inner conductor 20 includes a terminal connecting portion 22 in the form of a rectangular tube to be connected to an unillustrated male mating terminal of the mating connector and a wire connecting portion 24 to be connected to the coated wire 12 behind the terminal connecting portion 22.

The terminal connecting portion 22 is connected to the mating terminal by the mating terminal being inserted thereinto from behind. The wire connecting portion 24 is connected to the coated wire 12 by being crimped to a core 13 and an insulation coating 14 exposed in a front end part of the coated wire 12. Thus, the inner conductor 20 is a so-called female terminal.

[Dielectric 30]

As shown in FIG. 3, the dielectric 30 is formed of insulating synthetic resin into a rectangular parallelepiped shape long in a front-rear direction. The dielectric 30 is formed by assembling a lower dielectric 31 and an upper dielectric 32 with each other in a vertical direction.

Figure 2:
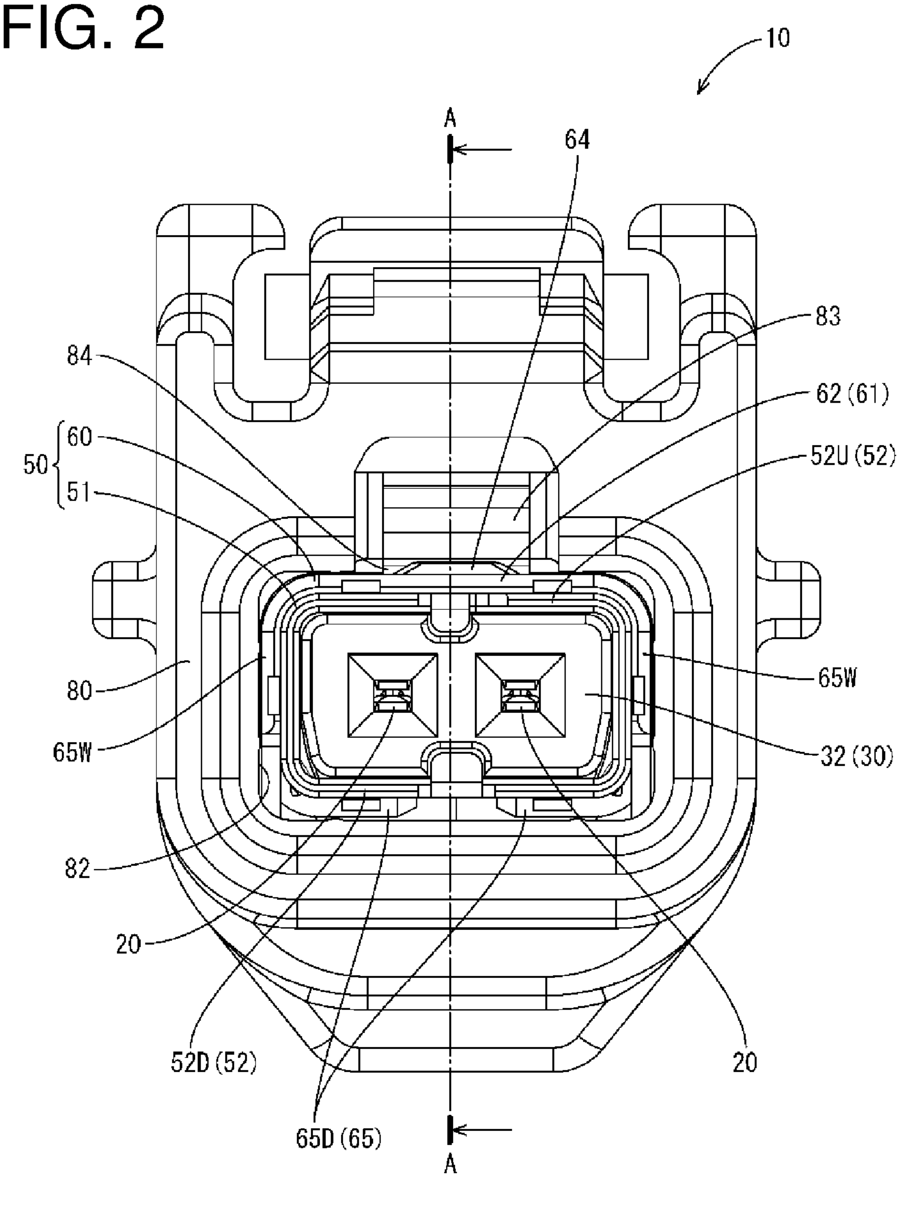
FIG. 2 is a front view of the connector.

As shown in FIGS. 2 and 3, two inner conductors 20 connected to the coated wires 12 and arranged side by side in a lateral direction are accommodated inside the dielectric 30 to be sandwiched from both vertical sides by the lower and upper dielectrics 31, 32.

[Outer Conductor 50]

The outer conductor 50 is fittable and connectable to an unillustrated mating outer conductor provided in the mating connector. As shown in FIGS. 3 to 6, the outer conductor 50 is composed of a first outer conductor 51 for accommodating the dielectric 30 inside and a second outer conductor 60 assembled with the first outer conductor 51 to cover the outer peripheries of the first outer conductor 51 and the shield body 15 of the cable 11.

[First Outer Conductor 51]

Figure 5:
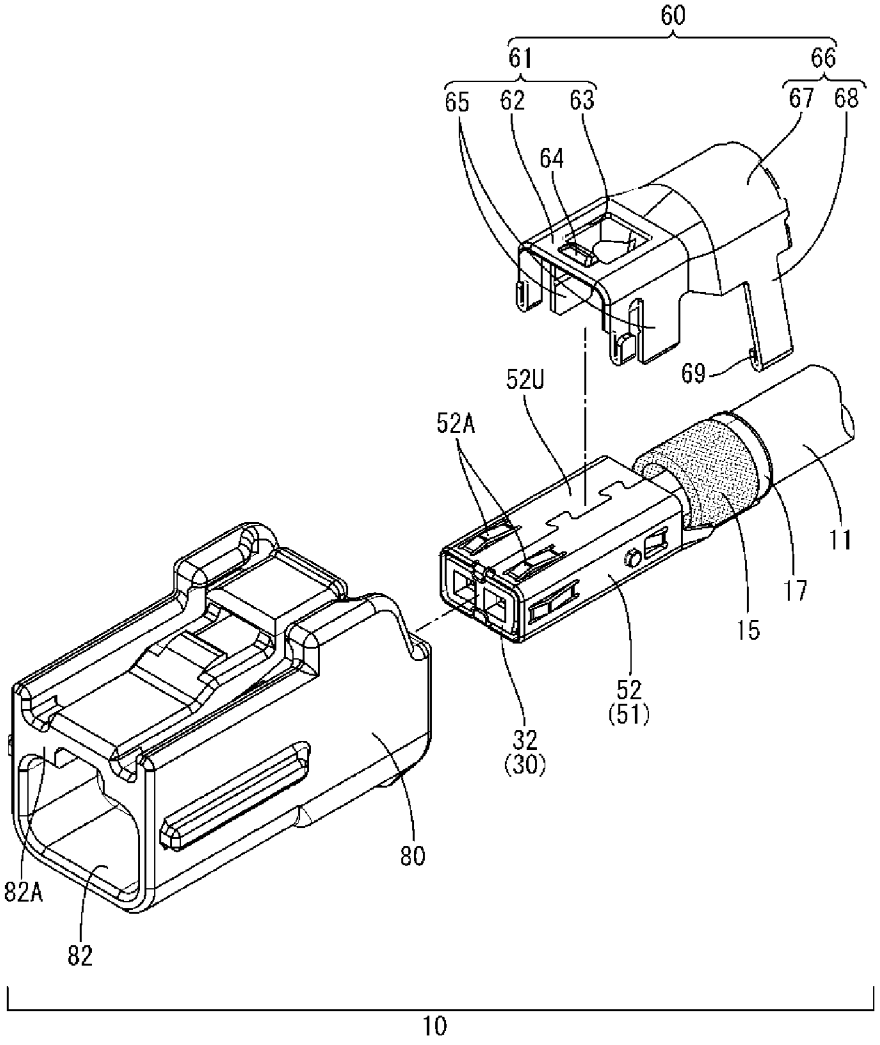
FIG. 5 is a partial exploded perspective view of the connector.
Figure 6:
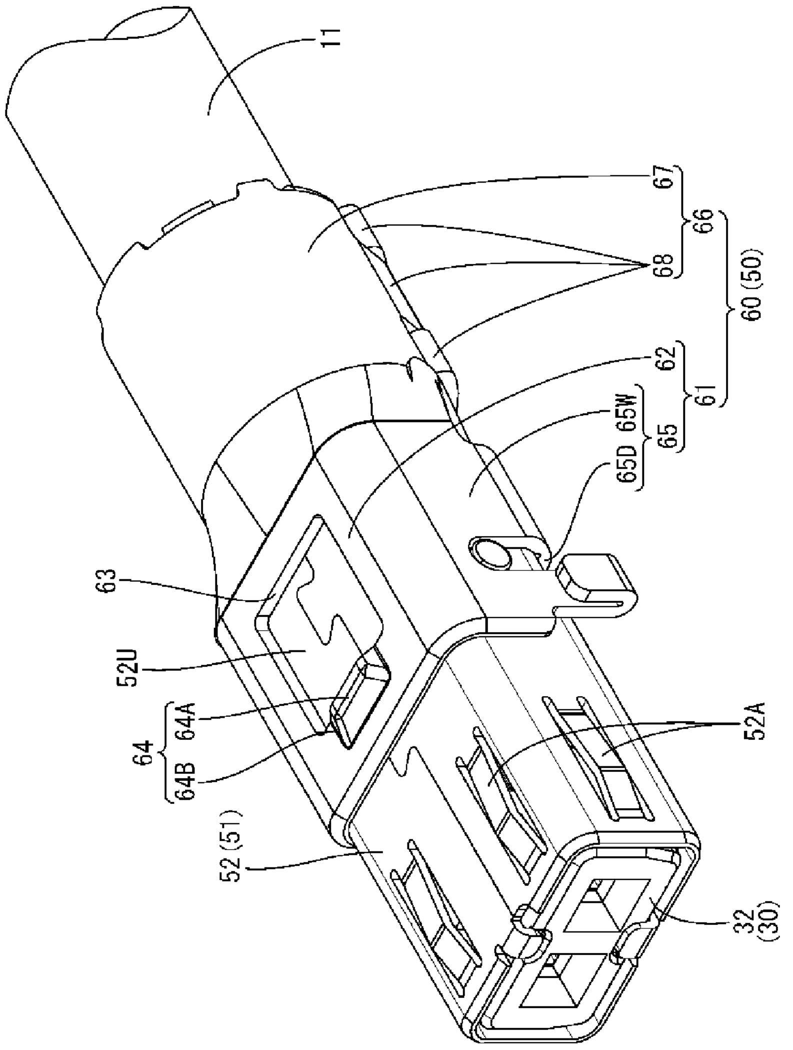
FIG. 6 is a perspective view of the connector with a housing removed.

The first outer conductor 51 is formed by processing a conductive metal plate material. As shown in FIGS. 5 and 6, the first outer conductor 51 includes a connecting tube portion 52 in the form of a rectangular tube substantially rectangular in a front view and a plate-like connecting portion 53 provided on the lower rear end edge of the connecting tube portion 52.

The dielectric 30 can be accommodated into the connecting tube portion 52 from behind. If the dielectric 30 is accommodated into the connecting tube portion 52, the inner conductors 20 are accommodated in a state electrically insulated from the connecting tube portion 52 by the dielectric 30 as shown in FIGS. 3 and 5.

The mating outer conductor is externally fittable to a front end part of the connecting tube portion 52. As shown in FIGS. 5 and 6, a plurality of resilient pieces 52A to be resiliently brought into contact with the mating outer conductor are formed in the outer wall of the front end part of the connecting tube portion 52. The plurality of resilient pieces 52A contact the inner surface of the mating outer conductor to electrically connect the connecting tube portion 52 and the mating outer conductor when the mating outer conductor is fit to the front end part of the connecting tube portion 52.

As shown in FIG. 3, the plate-like connecting portion 53 is formed to obliquely extend to a lower-rear side from the lower rear end edge of the connecting tube portion 52. A rear end part of the plate-like connecting portion 53 is arranged along a lower end part of the shield body 15 folded in the cable 11.

[Second Outer Conductor 60]

The second outer conductor 60 is formed by processing a conductive metal plate material. As shown in FIGS. 3 to 6, the second outer conductor 60 includes a covering portion 61 to be assembled with a rear end part of the connecting tube portion 52 and a shield connecting portion 66 provided on the rear edge of the covering portion 61.

Figure 4:
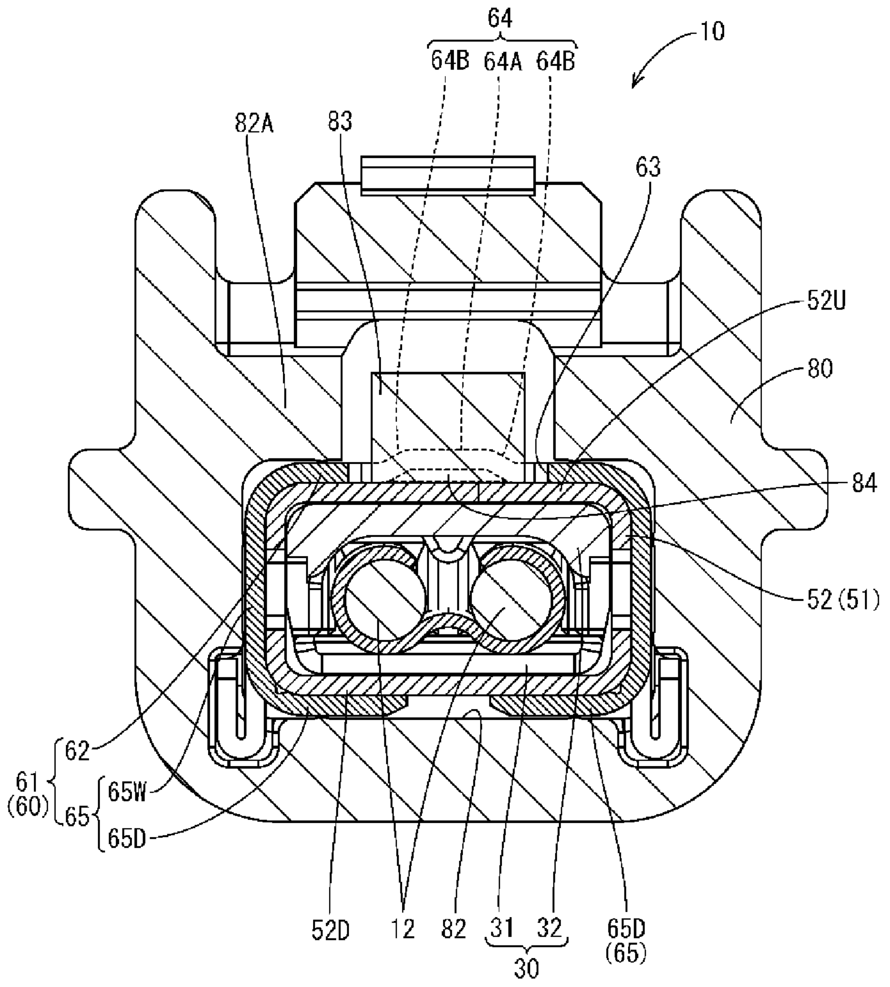
FIG. 4 is a section, corresponding to a cross-section along B-B of FIG. 3.

As shown in FIGS. 4 to 6, the covering portion 61 includes a ceiling plate (an example of a "wall plate") 62 rectangular in a plan view and to be arranged on an upper plate 52U of the connecting tube portion 52, a pair of side plates 65W extending downward from both lateral side edges of the ceiling plate 62 and a bottom plate 65D to be arranged along the outer surface of a lower plate 52D of the connecting tube portion 52.

The ceiling plate 62 is in the form of a flat plate larger than the connecting tube portion 52 in the lateral direction. As shown in FIGS. 3 and 4, the ceiling plate 62 includes a fitting hole 63 into which a terminal locking portion 83 of the housing 80 to be described later is fit from above.

Figure 8:
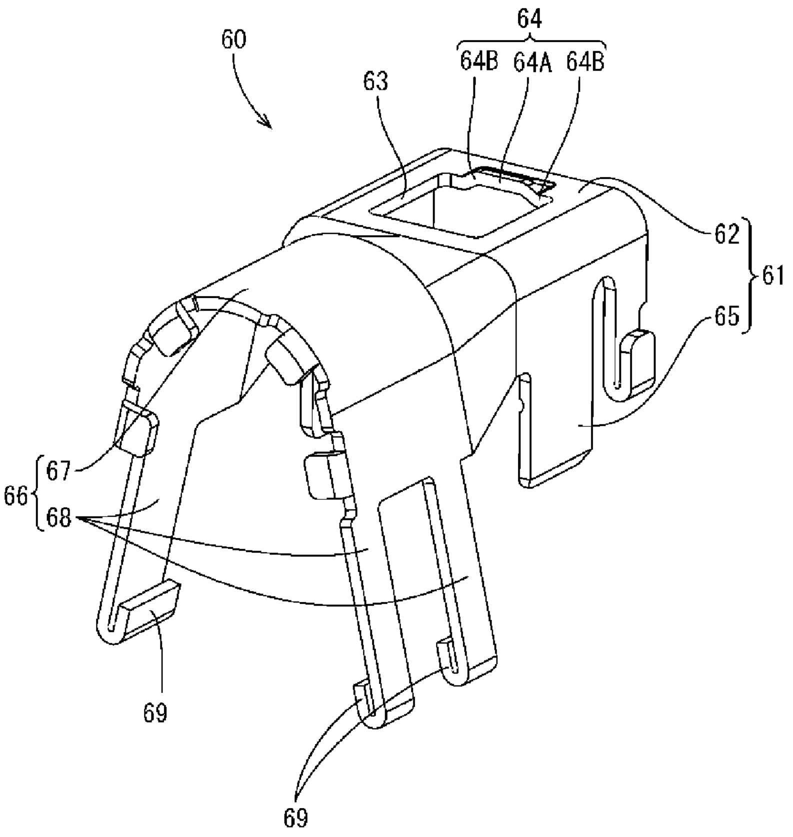
FIG. 8 is a perspective view of a second outer conductor viewed obliquely from behind.
Figure 9:
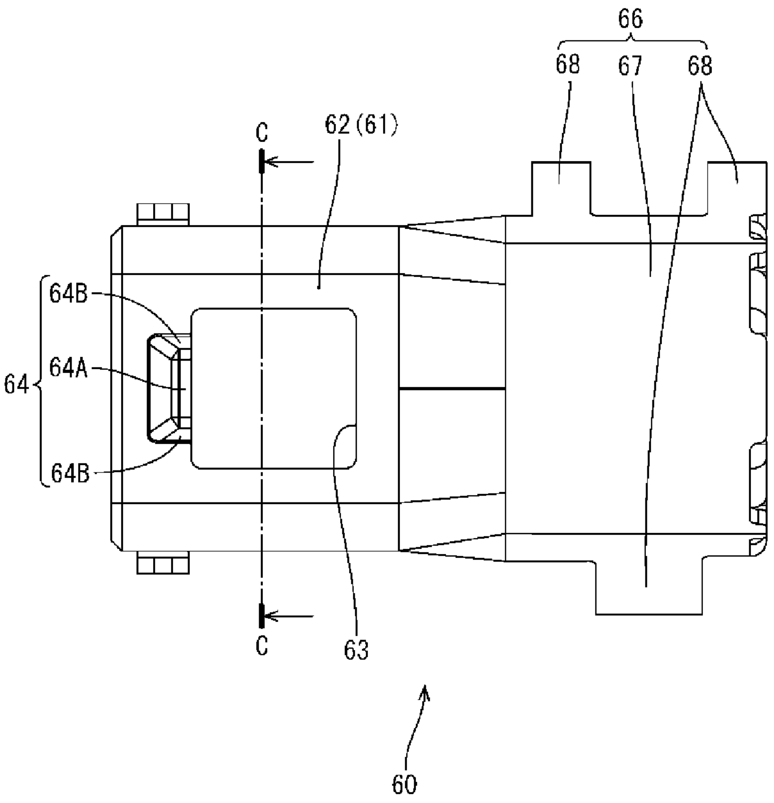
FIG. 9 is a plan view of the second outer conductor.
Figure 10:
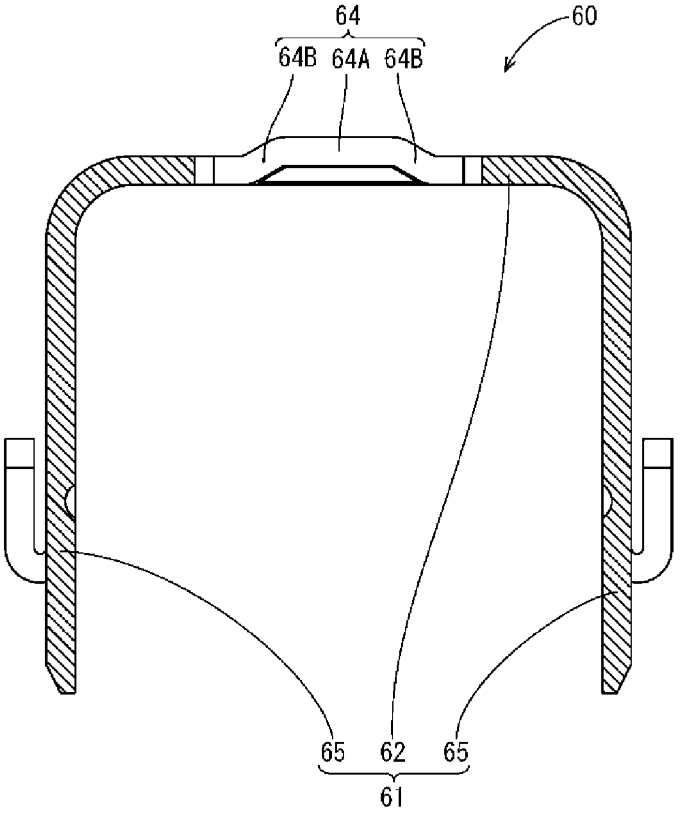
FIG. 10 is a section along C-C of FIG. 9.

The fitting hole 63 is formed to penetrate in a plate thickness direction (vertical direction) through the ceiling plate 62 in a laterally central part of the ceiling plate 62. As shown in FIGS. 6, 8 and 9, the fitting hole 63 is formed to be rectangular in a plan view. The ceiling plate 62 constituting the front edge of the fitting hole 63 is formed with a locked portion 64, which can be contacted from behind by the terminal locking portion 83.

[Locked Portion 64]

The locked portion 64 is formed by striking a part of the covering portion 61 constituting the front edge of the fitting hole 63. As shown in FIGS. 3, 4, 6 and 10, the locked portion 64 projects upward away from the connecting tube portion 52. A lateral length of the locked portion 64 is somewhat smaller than that of the fitting hole 63.

As shown in FIGS. 4 and 8 to 10, the locked portion 64 includes a body portion 64A arranged on an uppermost projecting end part and a pair of inclined portions 64B connected to the body portion 64A and the ceiling plate 62. The body portion 64A extends straight in the lateral direction. The pair of inclined portions 64B obliquely link the body portion 64 and the ceiling plate 62 on both lateral sides of the body portion 64A.

Accordingly, the locked portion 64 of this embodiment has a larger rear surface area than, for example, a locked portion formed by cutting and raising a front edge of a fitting hole in a covering portion. That is, the locked portion 64 can have a larger contact area with the terminal locking portion 83 than, for example, the locked portion formed by cutting and raising the part of the covering portion.

Further, since the pair of inclined portions 64B are connected to the body portion 64A and the ceiling plate 62 in the locked portion 64 of this embodiment, the strength of the locked portion 64 is improved as compared to the locked portion formed by cutting and raising the part of the covering portion. In this way, when the locked portion 64 and the terminal locking portion 83 are locked in the front-rear direction, the locked portion 64 can be suppressed from being turned up or broken by the terminal locking portion 83.

The bottom plate 65D is formed as a pair of barrel pieces 65 extending straight downward from the ceiling plate 62 as shown in FIGS. 5 and 8 in a state before the second outer conductor 60 is assembled with the first outer conductor 51.

The bottom plate 65D is arranged below the connecting tube portion 52 by assembling the second outer conductor 60 with the first outer conductor 51 and, as shown in FIGS. 6 and 7, bending the pair of barrel pieces 65 to wind around the connecting tube portion 52 from both left and right sides.

[Shield Connecting Portion 66]

Figure 7:
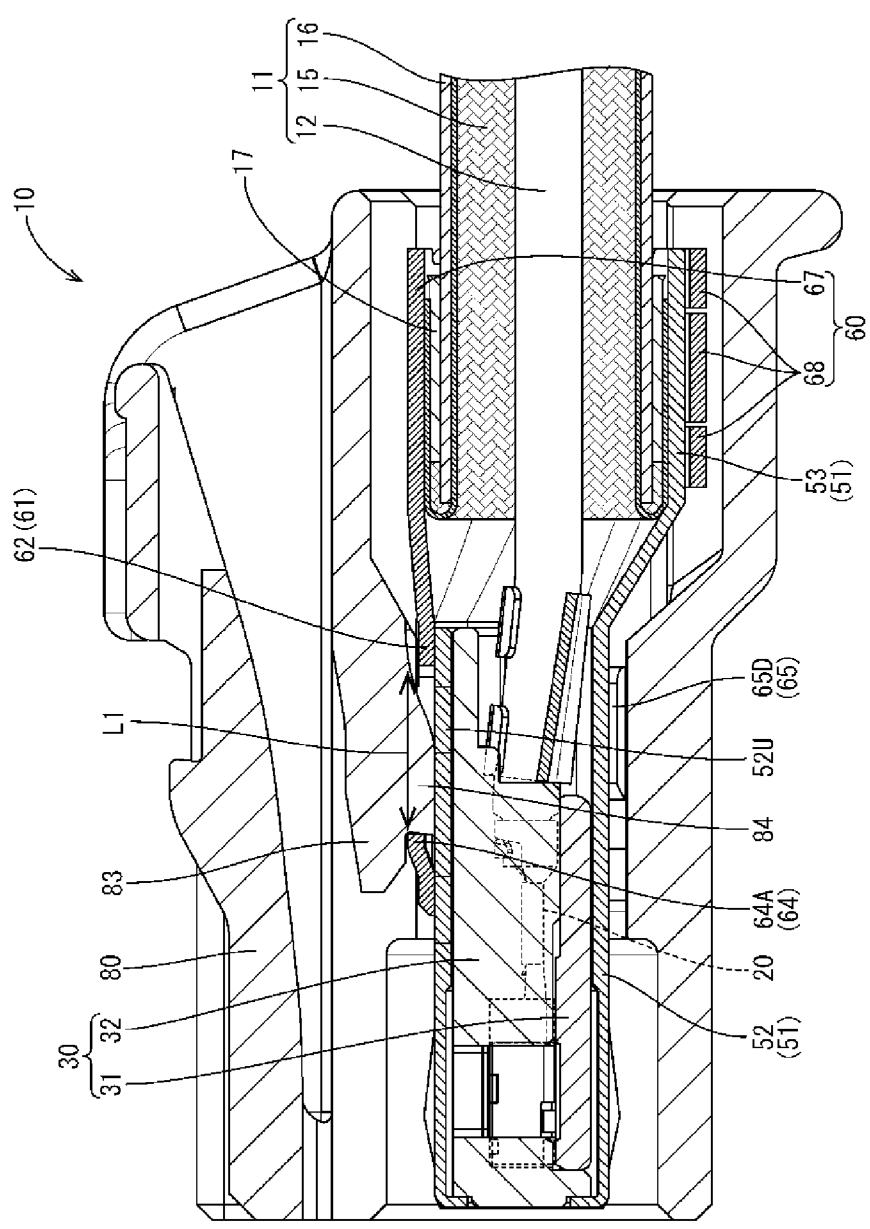
FIG. 7 is a section, corresponding to a cross-section of FIG. 3, showing a locked state of a locked portion and a terminal locking portion.

As shown in FIGS. 6 and 7, the shield connecting portion 66 is electrically connected and fixed to the shield body 15 by being crimped to the outer periphery of the shield body 15 folded in the cable 11. The shield connecting portion 66 includes an arcuately formed upper connecting portion 67 and a plurality of crimping pieces 68 provided on both lateral side edges of the upper connecting portion 67.

The upper connecting portion 67 is crimped to the outer periphery of an upper half of the shield body 15. The plurality of crimping pieces 68 extend straight obliquely downward from the both lateral side edges of the upper connecting portion 67 to be separated from each other as shown in FIGS. 5 and 8 in the state before the second outer conductor 60 is assembled with the first outer conductor 51. When the second outer conductor 60 is assembled with the first outer conductor 51, the plurality of crimping pieces 68 are crimped and fixed to wind around the outer sides of the plate-like connecting portion 53 arranged below the shield body 15 and the shield body 15 as shown in FIGS. 6 and 7.

A hook portion 69 folded inwardly is formed on a tip part of each crimping piece 68. As shown in FIGS. 5 and 8, the hook portions 69 are hooked to both lateral side edges of the plate-like connecting portion 53 to suppress the detachment of the respective crimping pieces 68 from the shield body 15 when the respective crimping pieces 68 are crimped to the shield body 15.

[Housing 80]

The housing 80 is made of insulating synthetic resin. As shown in FIG. 3, an accommodating portion 82 for accommodating the outer conductor 50 inserted from behind is provided inside the housing 80.

The accommodating portion 82 is formed to penetrate in the front-rear direction. The terminal locking portion 83 to be fit into the fitting hole 63 provided in the outer conductor 50 is formed on an upper inner wall 82A, which is an inner wall on an upper side of the accommodating portion 82.

[Terminal Locking Portion 83]

The terminal locking portion 83 is cantilevered obliquely to a front-lower side from the upper inner wall 82A. The terminal locking portion 83 is resiliently displaceable upward. The terminal locking portion 83 includes a locking protrusion 84 projecting downward.

In the process of inserting the outer conductor 50 into the accommodating portion 82, the locking protrusion 84 contacts the covering portion 61 of the outer conductor 50 and rides on the covering portion 61 and the locked portion 64 by the terminal locking portion 83 being resiliently displaced upward. When the outer conductor 50 is accommodated to a proper position in the accommodating portion 82, the locking protrusion 84 is fit into the fitting hole 63 as shown in FIG. 3. Thus, the outer conductor 50 is retained in the accommodating portion 82 by the locked portion 64 contacting the locking protrusion 84 of the terminal locking portion 83 from front to be locked.

Accordingly, the locked portion 64 in the outer conductor 50 projects toward the upper inner wall 82A provided with the terminal locking portion 83 on the front opening edge of the fitting hole 63 in the covering portion 61.

As shown in FIG. 4, the locking protrusion 84 is slightly larger in the lateral direction than the locked portion 64. That is, the outer conductor 50 is retained by the contact of the rear surface of the body portion 64A and the rear surfaces of the pair of inclined portions 64B in the locked portion 64 with the locking protrusion 84 from front.

Further, the locking protrusion 84 projects downward in the terminal locking portion 83, and the locked portion 64 projects upward from the covering portion 61 toward the upper inner wall 82A provided with the terminal locking portion 83. Accordingly, with the locked portion 64 contacting the locking protrusion 84 of the terminal locking portion 83 from front as shown in FIG. 7, the body portion 64A of the locked portion 64 is deeply locked to the terminal locking portion 83. That is, a shear distance (shear area) L1 of the terminal locking portion 83 in the locked portion 64 can be increased, for example, as compared to a shear distance (shear area) when a locked portion does not project upward and is shallowly locked to a terminal locking portion. In this way, the connector 10 of this embodiment can improve a holding force for the outer conductor 50 in the terminal locking portion 83, for example, as compared to the case where the locked portion does not project upward and is shallowly locked to the terminal locking portion.

This embodiment is configured as described above. Next, functions and effects of the connector 10 are described.

Figure 12:
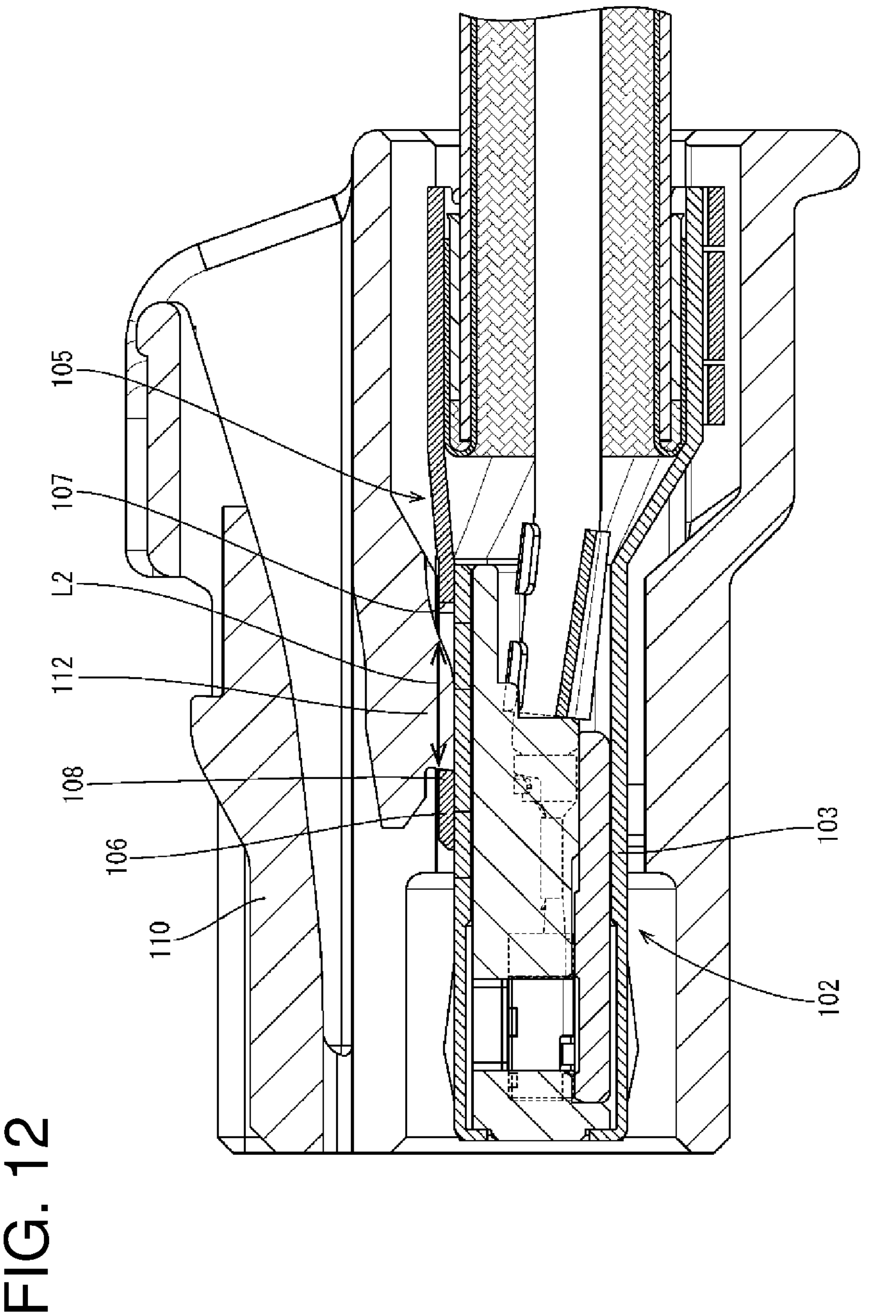
FIG. 12 is a section, corresponding to the cross-section of FIG. 3, of a connector in which a locked portion is not projecting.

For example, in the case of forming a locked portion lockable to a terminal locking portion of a housing without providing any hole in an outer conductor, a method for assembling a covering portion 106 of a second outer conductor 105 covering a connecting tube portion 103 of a first outer conductor 102 and locking a terminal locking portion 112 of a housing 110 to an edge part 108 of a fitting hole 107 formed to penetrate through the covering portion 106 as shown in FIG. 12 is considered.

However, as shown in FIG. 12, the terminal locking portion 112 is shallowly locked to the edge part 108 of the fitting hole 107 if the covering portion 106 is formed of a metal plate material. Thus, a shear distance (shear area) L2 of the terminal locking portion 112 by the edge part 108 of the fitting hole 107 is small and a holding force for the outer conductor 102, 105 in the terminal locking portion 112 is reduced. Further, if a large load is applied to the outer conductor 102, 105, the terminal locking portion 112 may slip and be disengaged from the fitting hole 107 if the terminal locking portion 112 is shallowly locked to the edge part 108 of the fitting hole 107.

Accordingly, to solve the above problem, the present inventor and other researchers found out the configuration of this embodiment as a result of diligent study. That is, this embodiment relates to the connector 10 to be connected to the cable 11, in which the outer peripheries of the coated wires (wires) 12 are covered with the shield body 15, and including the inner conductors 20, the outer conductor 50 and the housing 80. The inner conductors 20 are connected to the cores 13 of the coated wires 12, and the outer conductor 50 includes the tubular connecting tube portion 52, the covering portion 61 and the shield connecting portion 66. The connecting tube portion 52 accommodates the inner conductors 20 while being electrically insulated from the inner conductors 20, the covering portion 61 is arranged on the outer periphery of the connecting tube portion 52, the shield connecting portion 66 is connected to the shield body 15, the covering portion 61 includes the fitting hole 63 and the fitting hole 63 is formed to penetrate through the covering portion 61. The housing 80 includes the accommodating portion 82, the accommodating portion 82 accommodates the outer conductor 50 together with the inner conductors 20, the upper wall (inner wall) of the accommodating portion 82 is formed with the terminal locking portion 83 to be fit into the fitting hole 63, and the covering portion 61 includes the locked portion 64 for retaining the outer conductor 50 in the accommodating portion 82 by being locked to the terminal locking portion 83. The locked portion 64 projects toward the upper wall provided with the terminal locking portion 83 on the opening edge of the fitting hole 63 in the covering portion 61.

Since the locked portion 64 projects on the opening edge of the fitting hole 63 in the covering portion 61, the terminal locking portion 83 is deeply locked to the locked portion 64. Further, the terminal locking portion 83 and the locked portion 64 can be locked without providing any hole in the connecting tube portion 52 accommodating the inner conductors 20. In this way, the terminal locking portion 83 can be suppressed from slipping and being disengaged from the locked portion 64 while the entrance or leakage of noise into or from the outer conductor 50 is suppressed.

Further, since the terminal locking portion 83 is deeply locked to the locked portion 64, the shear distance (shear area) L1 of the terminal locking portion 83 on the edge part 108 of the fitting hole 107 can be increased, for example, as compared to the case where the terminal locking portion 112 is shallowly locked to the edge part 108 of the fitting hole 107 as shown in FIG. 12. That is, a holding force for the outer conductor 50 in the terminal locking portion 83 can be improved.

Further, the covering portion 61 includes the ceiling plate (wall plate) 62 to be arranged along the connecting tube portion 52, and the locked portion 64 includes the body portion 64A projecting most in the locked portion 64 and the inclined portions 64B obliquely connected to the body portion 64A and the ceiling plate 62 as shown in FIGS. 4 and 8 to 10.

For example, in the case of forming a locked portion projecting from a ceiling plate, a method for forming the locked portion by cutting and raising a part of the ceiling plate is considered. However, in the case of the locked portion formed by cutting and raising the part of the ceiling plate, the locked portion may be turned up and the locking of the locked portion and a terminal locking portion may be released if a large load is applied to an outer conductor.

However, according to this embodiment, since the inclined portions 64B are connected to the body portion 64A and the ceiling plate 62, it can be suppressed that the locking of the locked portion 64 and the terminal locking portion 83 is released such as by the turning-up of the locked portion 64. Further, according to this embodiment, a locking area of the terminal locking portion 83 and the locked portion 64 can be increased by as much as the inclined portions 64, for example, as compared to the locked portion formed by cutting and raising the part of the ceiling plate. In this way, the shear area of the terminal locking portion 83 in the locked portion 64 can be increased and the holding force for the outer conductor 50 in the terminal locking portion 83 can be improved.

Further, since the inclined portions 64B are formed on both sides of the body portion 64A, it can be suppressed that the locking of the locked portion 64 and the terminal locking portion 83 is released such as by the turning-up of the locked portion 64 as compared to the case where an inclined portion is formed only on one side of a body portion. Further, the shear area of the terminal locking portion 83 in the locked portion 64 can be increased and the holding force for the outer conductor 50 in the terminal locking portion 83 can be improved.

OTHER EMBODIMENTS

The technique disclosed in this specification is not limited to the above described and illustrated embodiment. For example, the following various modes are also included.

(1) In the above embodiment, the terminal locking portion 83 is formed on the upper inner wall 82A of the accommodating portion 82 and the locked portion 64 projects upward from the ceiling plate 62. However, there is no limitation to this and a terminal locking portion may be formed on a lower inner wall of an accommodating portion and a locked portion may project downward.

(2) In the above embodiment, the connector 10 is connected to the cable 11 including the two coated wires 12. However, there is no limitation to this and a connector may be connected to a coaxial cable in which one core is covered with insulating resin.

Figure 11:
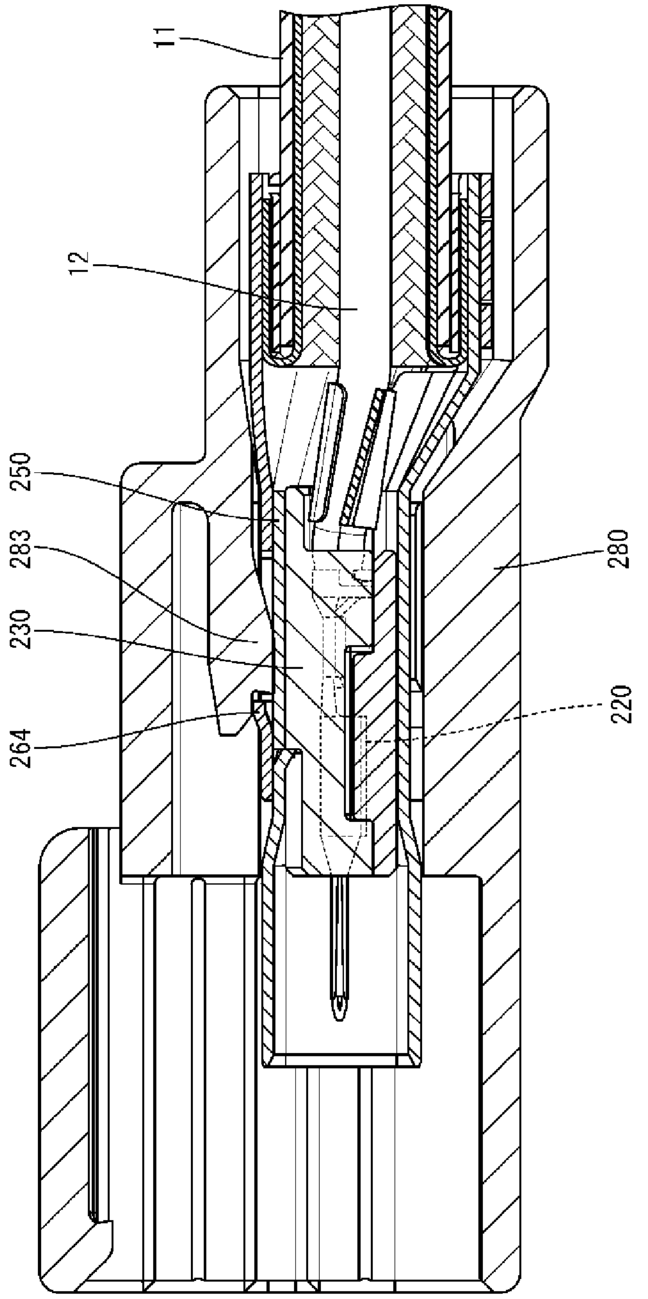
FIG. 11 is a section, corresponding to the cross-section of FIG. 3, of a connector of another embodiment.

(3) In the above embodiment, the female inner conductor 20 is connected to the coated wire 12. However, there is no limitation to this and, as shown in FIG. 11, a connector may include a male inner conductor 220 connected to a coated wire 12 of a cable 11, an outer conductor 250 for accommodating the inner conductor 220 via a dielectric 230 and a housing 280 for accommodating the outer conductor 250, and a locked portion 264 of the outer conductor 250 and a terminal locking portion 283 of the housing 280 may be locked.

LIST OF REFERENCE NUMERALS

10: connector
11: cable
12: coated wire (example of "wire")
13: core
14: insulation coating
15: shield body
16: sheath
17: sleeve
20: inner conductor
22: terminal connecting portion
24: wire connecting portion
30: dielectric
31: lower dielectric
32: upper dielectric
50: outer conductor
51: first outer conductor
52: connecting tube portion
52A: resilient piece
52D: lower plate of connecting tube portion
52U: upper plate of connecting tube portion
53: plate-like connecting portion
60: second outer conductor
61: covering portion
62: ceiling plate (example of "wall plate")
63: fitting hole
64: locked portion
64A: body portion
64B: inclined portion
65: barrel piece
65D: bottom plate of covering portion
65W: side plate of covering portion
66: shield connecting portion
67: upper connecting portion
68: crimping piece
69: hook portion
80: housing
82: accommodating portion
82A: upper inner wall
83: terminal locking portion
84: locking protrusion

What is claimed is:

1. A connector to be connected to a cable in which an outer periphery of a wire is covered with a shield body, comprising:

an inner conductor;

an outer conductor; and a housing, wherein:

the inner conductor is connected to a core of the wire, the outer conductor includes a tubular connecting tube portion, a covering portion and a shield connecting portion, the connecting tube portion accommodates the inner conductor while being electrically insulated from the inner conductor, the covering portion is arranged on an outer periphery of the connecting tube portion, the shield connecting portion is connected to the shield body, the covering portion includes a fitting hole, the fitting hole is formed to penetrate through the covering portion, the housing includes an accommodating portion, the accommodating portion accommodates the outer conductor together with the inner conductor, an inner wall of the accommodating portion is formed with a terminal locking portion to be fit into the fitting hole, the covering portion includes a locked portion for retaining the outer conductor in the accommodating portion by being locked to the terminal locking portion, and the locked portion projects toward the inner wall provided with the terminal locking portion on an opening edge of the fitting hole in the covering portion.

2. The connector according to claim 1, wherein:

the covering portion includes a plate-like wall plate arranged along the connecting tube portion, and the locked portion includes a body portion projecting most in the locked portion and an inclined portion obliquely connected to the body portion and the wall plate.

3. The connector according to claim 2, wherein the inclined portions are formed on both sides of the body portion.

* * * * *